United States Patent [19]
Starrick

[11] Patent Number: 5,171,026
[45] Date of Patent: Dec. 15, 1992

[54] HIGH PRESSURE GAS SEAL
[76] Inventor: Donald A. Starrick, 862 Lawrence St., Medina, Ohio 44256
[21] Appl. No.: 787,110
[22] Filed: Nov. 4, 1991
[51] Int. Cl.$^5$ ............................................. F16T 15/44
[52] U.S. Cl. ........................................ 277/57; 277/53; 277/134
[58] Field of Search ........................ 277/15, 16, 17, 53, 277/57, 70, 71, 134, DIG. 10

[56] References Cited

U.S. PATENT DOCUMENTS

| | | | |
|---|---|---|---|
| 958,612 | 5/1910 | Eyermann | 277/57 |
| 1,151,964 | 8/1915 | Peterson | 277/57 |
| 4,314,483 | 2/1982 | Wyler | 277/53 |
| 4,335,886 | 6/1982 | Frey et al. | 277/57 |

FOREIGN PATENT DOCUMENTS

| | | | |
|---|---|---|---|
| 0927842 | 5/1955 | Fed. Rep. of Germany | 277/53 |
| 0714089 | 2/1980 | U.S.S.R. | 277/53 |
| 0785576 | 12/1980 | U.S.S.R. | 277/53 |
| 0956879 | 9/1982 | U.S.S.R. | 277/53 |

Primary Examiner—William A. Cuchlinski, Jr.
Assistant Examiner—Daniel G. DePumpo
Attorney, Agent, or Firm—Richard L. Stroup

[57] ABSTRACT

High pressure seal between a housing and a rotating shaft includes a first annular member for attachment to the shaft, and a second annular member for attachment to the housing. The first and second annular members form nozzles and a circular leakage path permitting gas to flow from a high pressure area through the nozzles and back to the high pressure area and also form an axially leakage path to the low pressure area. The seal includes elements for causing the predominant flow of gas leaking from the high pressure area to flow along a circular path through the nozzles and back to the high pressure area, when the shaft is rotating at operating conditions.

20 Claims, 4 Drawing Sheets

HIGH PRESSURE GAS SEAL

BACKGROUND OF THE INVENTION

1. Field of the Invention

The present invention relates to a high pressure gas seal between a high speed rotating shaft and a stationary housing. More particularly, the invention is directed to a seal which utilizes nozzles and vanes to produce a gas seal between the shaft and housing.

2. Description of the Prior Art

Seals between a shaft and housing typically have touching parts to seal in the static condition and then means to separate when the shaft is rotating, thereby allowing some leakage and reducing wear. The force balance between the seal and seal plate is usually accomplished by grooves, pads, and similar structures which are balanced against springs during static conditions and lift the seal from the seal plate for dynamic operations. Several problems exist with these types of seals. There is always some wear when the shaft begins rotating until the opposing elements of the seal lift off. Further, the springs are always in motion due to axial end play of the shaft and fatigue fail with time. In addition, there may be oil present from nearby bearings that vaporizes and burns on the seal plate which highly affects the coefficient of friction between the sealing face and the seal plate.

The prior art seals known to the applicant present significant problems when the speed of the shaft is high, often over 10,000 rpm. The high rpm of the shaft gives rise to very high rotating stresses in the seal plate itself. The seal plate must be appropriately balanced and sized such that stress concentrations are kept to a minimum. The seal plate itself in high speed seals is typically a mass of steel one to two inches thick with a central hole and grooves to drive it at the rpm of the shaft. This seal plate is usually ground and polished and must be balanced very acutely to minimize the rotating stresses. Any error in balancing the seal will adversely affect the stability of the seal. Similarly, the seal is subjected to variations in temperature and pressure which adversely affect the stability of the seal plate.

SUMMARY OF THE INVENTION

The present invention overcomes many of the problems of the prior art by utilizing closely rotating parts and the principles of flow of converging and diverging nozzles. The seal includes vanes and diverging and converging nozzles. As explained more fully below, with high pressure gas (for example, 500 psi) on one side of the seal, there are basically two paths of leakage when the seal is not rotating. One path is through a diverging nozzle where the velocity of flow becomes less with increasing divergence. The other path is through a converging nozzle where the velocity of flow is increased and directed back into the diverging nozzle. When the seal is rotated at high operating speeds, the seal creates a circular flow of gas which returns most of the leaking gas back to the high pressure area. During this circular flow, the two nozzles act as converging nozzles.

An object of the invention is to create a seal which has no touching parts but still minimizes leakage when the seal is not rotating.

Another object of the invention is to produce a seal that during steady state rotation creates a circular path of flow by pushing or pulling the majority of leaking gas back into the high pressure reservoir.

Yet another object is to provide a seal in which the members forming the seal are spaced from each other and a limited path of leakage is provided to accommodate the axial end play of the shaft and run-out of the shaft in the bearings.

Another object of the invention is to produce a seal with an acceptable level of leakage that has no wearing parts that may fail.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a high pressure gas seal between a housing and a rotating shaft for sealing a high pressure area from a low pressure area, the gas seal comprising a first annular member for attachment to the shaft; means for attaching the first annular member to the shaft in a sealed relationship which prevents the flow of gas along the interface of the first annular member and the shaft; a second annular member for attachment to the housing; means for attaching the second annular member to the housing in a sealed relationship which prevents the flow of gas along the interface of the second annular member and the shaft; the first and second annular members cooperating to form a circular leakage path from the high pressure area between the first and second annular members and back to the high pressure area, the first and second members being spaced from each other at all locations; and means for causing the predominant flow of high pressure gas from the high pressure area to flow along the circular path and back to the high pressure area, when the shaft is rotating at operating conditions.

In the preferred embodiment, the seal utilizes nozzles and vanes to control the flow of leaking gas.

It is to be understood that both the foregoing general description and the following detailed description are exemplary and explanatory only and are not restrictive of the invention, as claimed.

DESCRIPTION OF THE DRAWINGS

The accompanying drawings, which are incorporated in and constitute a part of this specification, illustrate an embodiment of the invention and together with the description serve to explain the principles of the invention.

DESCRIPTION OF THE PREFERRED EMBODIMENT

Reference will now be made in detail to the present preferred embodiment of the invention, an example of which is illustrated in the accompanying drawings.

Wherever possible, the same reference numbers will be used throughout the drawings to refer to the same or like parts.

Figure 1:
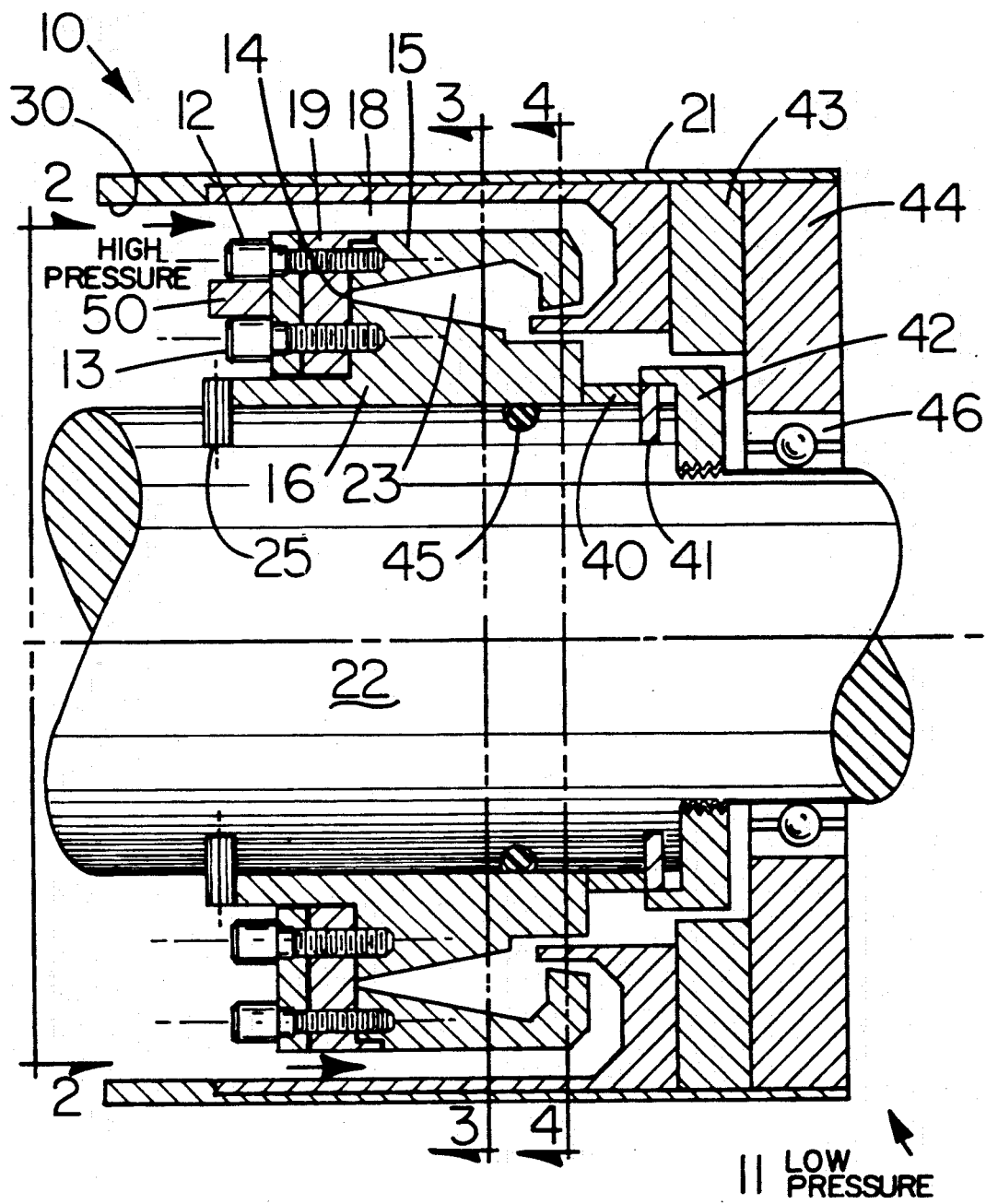
FIG. 1 is a longitudinal cross sectional view of a preferred embodiment of the seal of the present invention.

As shown in FIG. 1, the seal of the present invention has high pressure gas 10, typically 500 psi, on one side of a seal and low pressure gas, typically ambient, on the other side 11. There is thus a tendency for gas to leak toward ambient. The seal is located between a housing 21 and a shaft 22. The housing 21 is stationary, and the shaft 22 at Operating conditions is rotating at high speeds, typically 10,000 rpm or above. As high pressure gas is pumped into the high pressure side, an acceptable leakage rate to the low pressure side must be maintained.

The seal of the present invention consists of rotating parts 15, 16, and 19 and stationary part 17. Parts 15, 16, and 19 are fixed to and rotate with the shaft 22. One or more pins 25 serve to positively attach these parts to the shaft 22 and drive the rotating parts through the rotating shaft.

As shown in FIG. 1, part 17 is an annular sleeve having a reverse C-shaped longitudinal cross section. The outer diameter of the sleeve 17 is sized to slidably fit within the housing and abuts against a stop 30 formed on the housing. The sleeve is fixed to the housing 21 and is held in a sealed relationship with the housing by conventional means well known in the art. As a result, any leakage of gas along the interface of the sleeve 17 and the housing is prevented. The reverse C-shaped end of the sleeve 17 closest to the low pressure area creates a cylindrical chamber into which high pressure gas can flow. As will be described more fully below, the lower horizontal portion of the sleeve 17 cooperates with part 15 to form a nozzle. The sleeve preferably is cast and then machined to produce smooth surfaces, at least on the interior surface of the sleeve.

Part 16 is an annular sleeve which is a very close tolerance fit onto the shaft 22 to minimize any potential leakage. An O-ring 45 is placed between sleeve 16 and shaft 22. The sleeve is fixed and sealed to the shaft by conventional means. As shown in FIG. 1, one or more pins 25 connect the sleeve 16 and ensure that they rotate as a single unit. The end of sleeve 16 closest to the low pressure side of the seal is perpendicular to the shaft. The top wall of sleeve 16 has an extended notch on the right side and then inclines upwardly toward the left side, proximate the high pressure gas. As will be explained more fully below, the upwardly inclinded top wall of sleeve 16 and the downwardly inclined bottom wall of part 15 form a second nozzle.

Part 15 is another annular sleeve which generally has an L-shaped cross section. The bottom of the annular sleeve 15 is inclined relative to the axis of the shaft, and this bottom wall in combination with element 17 and element 16 defines nozzle 24, a chamber 23, and a nozzle 14.

Figure 2:
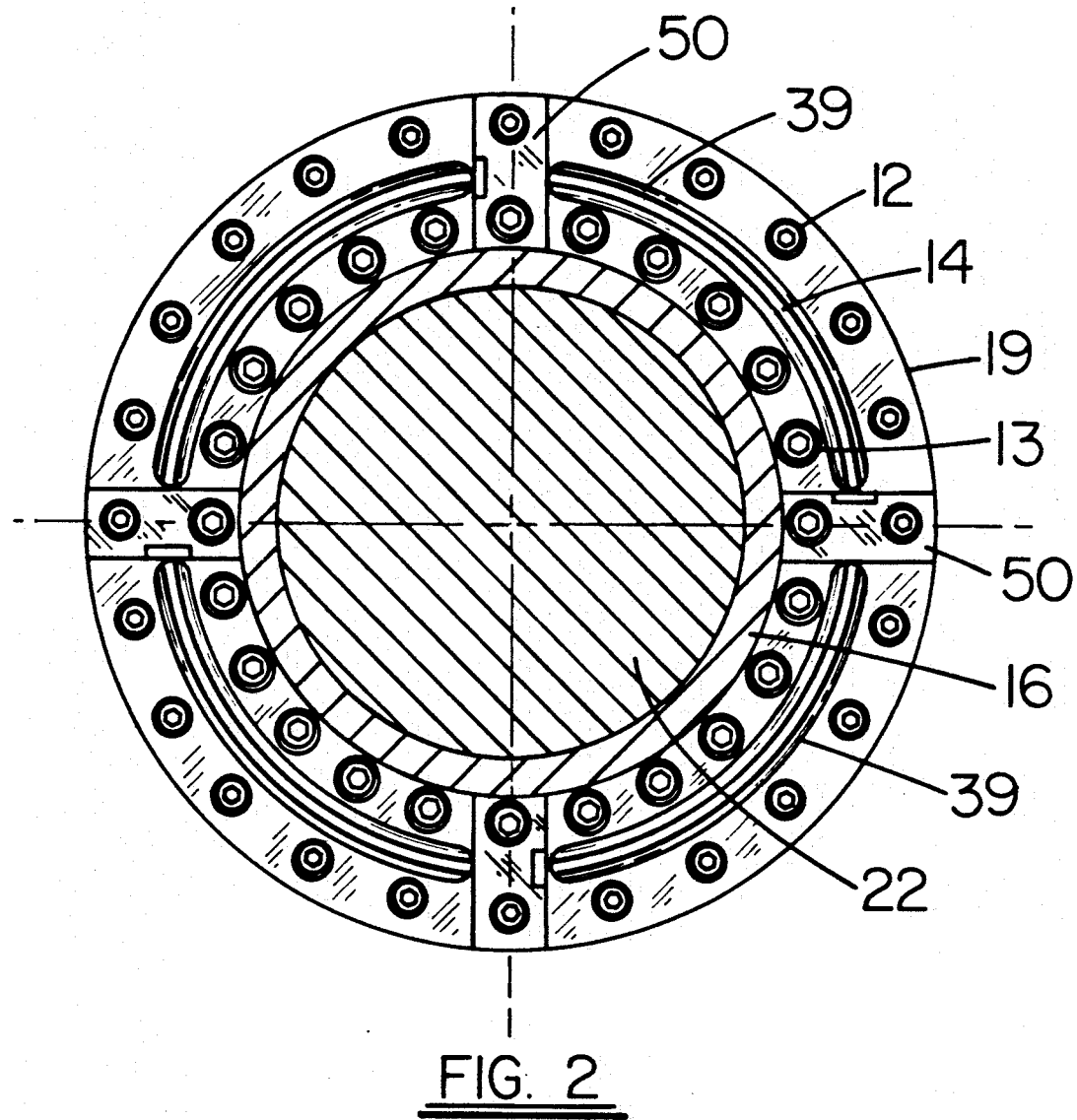
FIG. 2 is an axial cross sectional view of the seal, taken along the line 2—2 shown in FIG. 1
Figure 3:
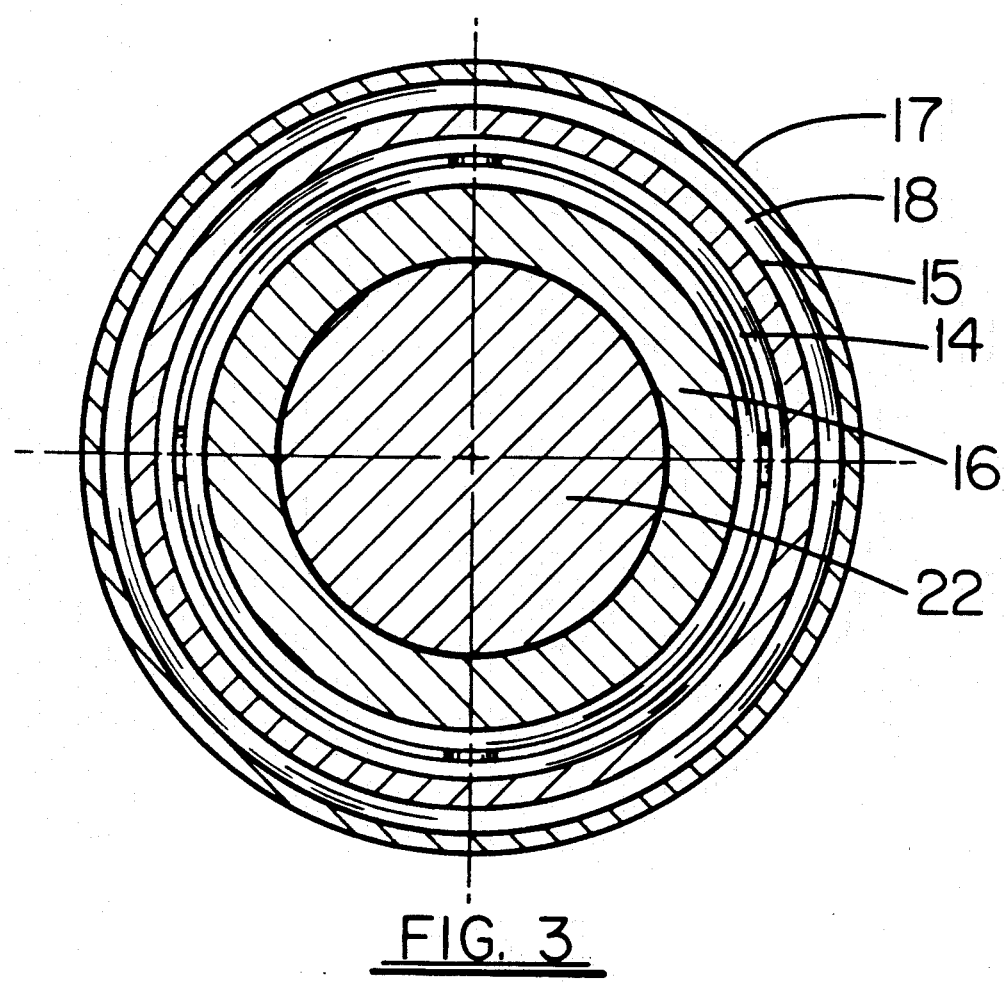
FIG. 3 is an axial cross sectional view of the seal, taken along the line 3—3 shown in FIG. 1.
Figure 4:
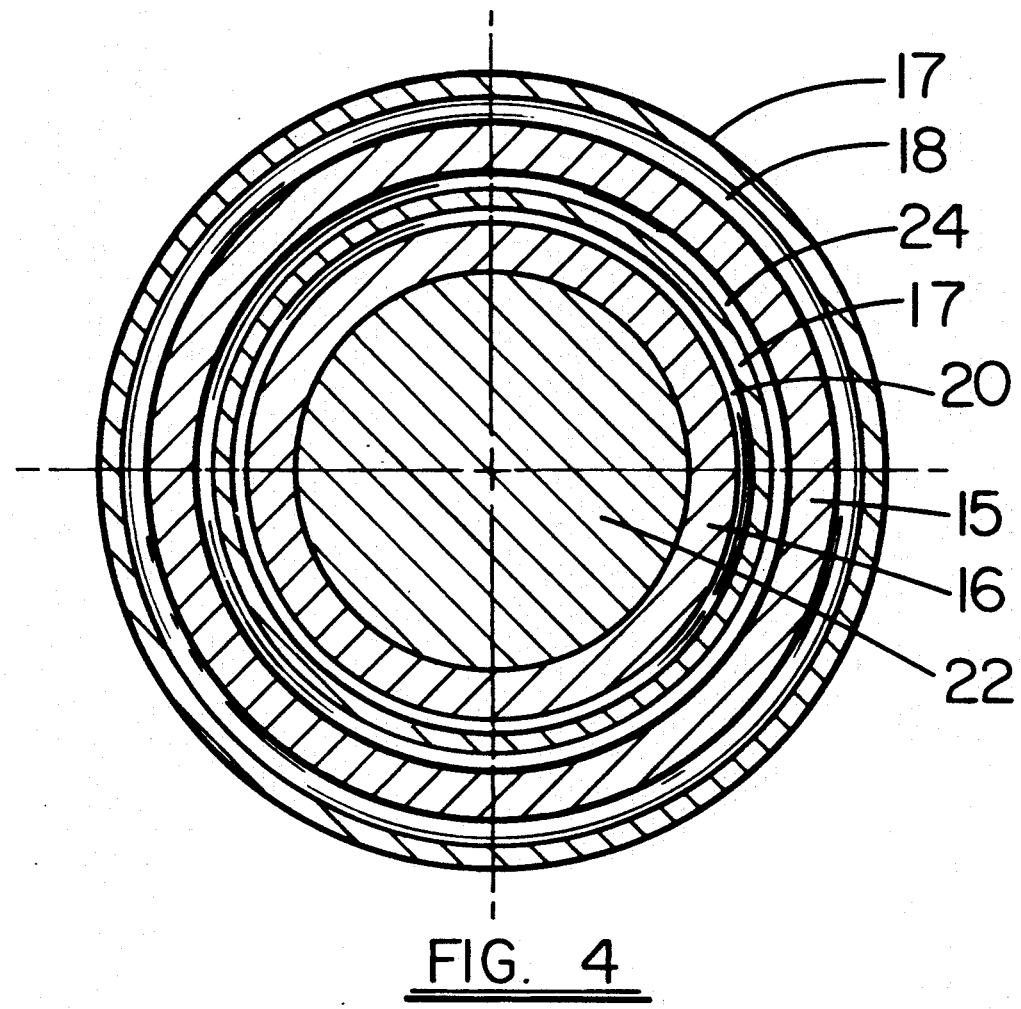
FIG. 4 is an axial cross sectional view of the seal, taken along the line 4—4.

As shown in FIGS. 1 and 2, sleeves 15 and 16 are held together by annular member 19 and a plurality of bolts 12 and 13. Annular member 19 includes a plurality of elongated, curved apertures 39 (shown in FIG. 2) which are in fluid communication with the high pressure on one side and the nozzle 14 on the other side. Bolts 12 and 13 extend through annular member 19 and are threaded into sleeves 15 and 16, respectively. As shown in FIG. 1, the annular member 19 has an elongated top lip which serves to more securely hold element 15 in place. The elements 15, 16, 12, 13, and 19, when assembled, provide a single annular member which rotates with the shaft 22.

There are basically 3 paths of potential leakage from the reservoir the seal contains. Path one is from the reservoir 10 through the passage 18 and into the converging nozzle 24 where the flow is accelerated. The second path is from the reservoir 10 into the diverging nozzle 14 where the flow is decelerated. Both of these paths lead into the area 23 positioned between these nozzles. The third and final path is from area 23 out between the rotating and stationary parts, path 20. This final path is created at close tolerance and has a substantial length, to minimize leakage. Regardless of whether the shaft is or is not rotating, the gas will tend to flow along path one and path three, as described. The seal of the present invention is designed to minimize flow along path two when the shaft is not rotating and is designed to reverse the flow of gas along path two back into the high pressure area, when the seal is rotating at operating conditions.

To provide the reverse flow along path two, the present invention includes a plurality of vanes 50 which are fixed to annular member 19 on the high pressure side. These vanes are positioned adjacent the curved apertures 39 and during rotation at operating conditions create a vacuum which tends to pull gas flow through nozzle 14 back to the high pressure area. Although the vanes shown in the preferred embodiment (FIG. 2) are positioned on the ends of the curved apertures 39, it will be apparent to those skilled in the art that vanes, fan blades, and similar structures could be positioned along the sides of the apertures, or at similar locations, which create a sufficient vacuum or suction to pull gas through nozzle 14 to the high pressure area.

As shown diagrammatically in FIG. 1, the annular element 16 is held to the shaft by an annular spacer 40 and a locking nut 42, as is well known in the art. As the shaft 22 extends beyond the exterior of the housing, the shaft decreases at 46 in diameter so as to accept a standard thrust or radial bearing 44. As is known in the art, the thrust or radial bearing 44 is fixed to both the shaft and the housing 21 and serves to hold the shaft in axial position relative to the housing.

Due to pressure and temperature variations, there typically is some axial play in the seal between the shaft and the housing. The seal of the present invention provides for such axial play by including a spacing between the rear end of annual member 15 and the rear end of sleeve 17. Similarly, the notchformed in elements 16 is elongated to provide for axial play between interface of member 16 and 17 where gap 20 is formed.

The present invention minimizes leakage of gas from high pressure to low pressure by using a plurality of chambers and nozzles in a particular arrangement. As will be described in more detail below, when the seal is rotating at standard speeds, the seal provides a clockwise flow of gas which enters the large chamber between element 15 and the outer side wall of sleeve 17, flows through nozzle 24 into large chamber 23, and flows through a plurality of circumferentially spaced nozzles 14 and elongated apertures 39 back to the high pressure area 10. Vanes 50 are located in high pressure chamber 10 to break up the flow through nozzle 14 when the seal is rotating. As a result, when the seal is rotating at high speeds, the gas will flow from chamber 23 back into high pressure chamber 10 through passageway 14. Thus, the present invention creates a predominate circular flow path when the seal is rotating. The majority of leaking gas flows from the high pressure area through chamber 18, to nozzle 24, into chamber 23, through nozzle 14, out apertures 39, and back to high pressure area 10. A small amount of gas will leak out leakage path 20 to low pressure side 11.

It will be apparent to those skilled in the art that the present invention can be varied to meet various applications. Normally, the seal will need to be designed through analytical and empirical testing, to achieve the best results for particular applications. Generally, the velocity of gas immediately before or after nozzles 24 and 14 is extremely low relative to the velocity in the nozzles. Therefore, for the purposes of analytical considerations, the velocity in the large chamber areas can be considered to be minimum or zero.

Since the predominant flow of gas returns to the high pressure area through nozzle 14 when the seal is rotating, the flow through nozzles 24 and 14 can be assumed to be the same. Using the theory of conversation of mass for flowing through the nozzles $\dot{M} = \rho_1 A_1 V_1 = \rho_2 A_2 V_2$. Since the large reservoir exists behind each nozzle, then $V_1$ for both nozzles is essentially zero and $\dot{M} = \rho A V$. Substituting $P/\rho = RT$, the equation for the mass flow of a converging nozzle becomes $$\dot{M} = \frac{2P}{RT}\left[\left(d_o x_2 + \left(\frac{x_2^2}{2}\tan\theta\right)\right)\right](V)$$

and the equation becomes for a diverging nozzle.

$$\dot{M} = \frac{2P}{RT}\left[\left(d_i X_2 + \left(\frac{x_2^2}{2}\tan\theta\right)\right)\right](V)$$

The above equations can be used to achieve a preliminary design of the seal of the present invention to achieve a desired flow rate through nozzles for given pressures at both rotating and non-rotating conditions. Since the assumptions used to derive the above equations oversimplify the complex gas flow and conditions, the preliminary design should be empirically tested and further modifications made to create the desired flow rates and stability of operation. It will be apparent to those skilled in the art that the present invention by creating a predominate circular flow path minimizes leakage and friction, while providing significant stability.

Having described the broad concepts of the present invention, a specific example will now be described. For a seal in which the high pressure is approximately 500 psi, the low pressure is atmospheric, and the speed of rotation is approximately 10,000 rpm, the diverging nozzle 14 of the preferred embodiment has an angle of 10 degrees and is 1.5 inches long. The opening is 0.040 inches. The converging nozzle 24 for the above application is 0.5 inches long, has an angle of 5 degrees and an opening of 0.030 inches.

It should be noted that although the dimensions for the preferred embodiment are given, the angles, lengths and opening of the nozzles, as well as the design of the chambers and vanes, could be modified without departing from the principles and broad concept of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A high pressure gas seal between a housing and a rotating shaft for sealing a high pressure area from a low pressure area, the gas seal comprising:
    a first annular member for attachment to the shaft;
    means for attaching the first annular member to the shaft in a sealed relationship which prevents the flow of gas along the interface of the first annular member and the shaft;
    a second annular member for attachment to the housing;
    means for attaching the second annular member to the housing in a sealed relationship which prevents the flow of gas along the interface of the second annular member and the housing;
    the first and second annular members cooperating to form a circular leakage path for gas from the high pressure area, between the first and second annular members, and back through the first annular member to the high pressure area, the first and second members being spaced from each other at all locations;
    a first nozzle positioned in said circular leakage path and formed between said first annular member and said second annular member, said first nozzle axially converging toward the high pressure area;
    a second nozzle positioned in said circular leakage path and formed within said first annular member, said second nozzle axially converging toward the high pressure area; and
    means for causing the predominant amount of gas leaking from the high pressure area to flow along the circular path and return to the high pressure area, when the shaft is rotating at operating conditions.

2. The high pressure gas seal of claim 1 wherein said first and second nozzles are substantially in axial alignment with each other.

3. The high pressure gas seal of claim 1 wherein said second nozzle is positioned downstream of said first nozzle when gas flows along said circular leakage path to the high pressure area.

4. The high pressure gas seal of claim 3 wherein said first and second nozzles are substantially in axial alignment with each other.

5. The high pressure gas seal of claim 1 further comprising a chamber formed in said first annular member and an axial leakage path formed between said first annular member and said second annular member and in fluid communication with the low pressure area, said axial leakage path and said first and second nozzles being in fluid communication with said chamber, whereby a first flow path is formed from the high pressure area through said first nozzle and to said chamber, a second flow path is formed between said second nozzle and said chamber, and a third flow path is formed from the low pressure area through said axial leakage path and to said chamber.

6. The high pressure gas seal of claim 1 wherein gas flows along said second flow path from the high pressure area toward said chamber when the shaft is not rotating and wherein said causing means causes the gas to flow from said chamber along the second flow path toward the high pressure area when said shaft is rotating.

7. The high pressure gas seal of claim 6 wherein said first and second nozzles are substantially in axial alignment with each other.

8. The high pressure gas seal of claim 1 wherein the causing means includes a plurality of vanes located at the axial end of the first annular member that is in communication with the high pressure area.

9. The high pressure gas seal of claim 8 wherein the vanes are adjacent the second nozzle.

10. The high pressure gas seal of claim 1 wherein said second annular member is an annular sleeve having a reverse C-shaped longitudinal cross section.

11. The high pressure gas seal of claim 10 wherein said first annular member includes two annular sleeves and an annular disk fixed to each of said two annular sleeves.

12. The high pressure gas seal of claim 11 wherein the plurality of vanes are fixed to said annular disk.

13. The high pressure gas seal of claim 1 wherein said second annular member is an annular sleeve having a reverse C-shaped longitudinal cross section and said first annular member includes a first annular sleeve for attachment to a shaft, a second annular sleeve radially spaced outward from the first annular sleeve, and an annular disk fixed to each of said two annular sleeves.

14. The high pressure gas seal of claim 13 wherein a portion of said C-shaped member projects between said first and second sleeves, and said first nozzle is formed between said second annular sleeve and this projecting portion of said C-shaped member and wherein said second nozzle is formed between said first and second annular sleeves.

15. The high pressure gas seal of claim 14 wherein an axial leakage path is formed between the first sleeve and the projecting portion of said C-shaped member.

16. The high pressure gas seal of claim 13 wherein an elongated aperture is formed in said annular disc and is in fluid communication in the high pressure area and said second nozzle.

17. A high pressure gas seal between a housing and a rotating shaft for sealing a high pressure area from a low pressure area, the gas seal comprising:
a first annular member for attachment to the shaft;
means for attaching the first annular member to the shaft in a sealed relationship which prevents the flow of gas along the interface of the first annular member and the shaft;
a second annular member for attachment to the housing;
means for attaching the second annular member to the housing in a sealed relationship which prevents the flow of gas along the interface of the second annular member and the housing;
the first and second annular members cooperating to form a circular leakage path for gas from the high pressure area, between the first and second annular members, and back through the first annular member to the high pressure area, the first and second members being spaced from each other at all locations;
a first nozzle positioned in said circular leakage path and formed between said first annular member and said second annular member, said first nozzle axially converging toward the high pressure area;
a second nozzle positioned in said circular leakage path and formed within said first annular member, said second nozzle axially converging toward the high pressure area and being substantially in axial alignment with said first nozzle;
an axial leakage path formed between said first annular member and said second annular member, said axial leakage path being in fluid communication at one end with the low pressure area and at the opposite end with said first and second nozzles; and
means for causing the predominant amount of gas leaking from the high pressure area to flow along the circular path and return to the high pressure area, when the shaft is rotating at operating conditions.

18. The high pressure gas seal of claim 17 wherein said second nozzle is positioned downstream of said first nozzle when gas flows along said circular leakage path to the high pressure area.

19. A high pressure gas seal between a housing and a rotating shaft for sealing a high pressure area from a low pressure area, the gas seal comprising:
a first annular member for attachment to the shaft, said first annular member having one open end;
means for attaching the first annular member to the shaft in a sealed relationship which prevents the flow of gas along the interface of the first annular member and the shaft;
a second annular member for attachment to the housing, said second annular member having an axially-oriented elongated finger extending into the open end of said first annular member;
means for attaching the second annular member to the housing in a sealed relationship which prevents the flow of gas along the interface of the second annular member and the housing;
the first and second annular members cooperating to form a circular leakage path for gas from the high pressure area, between the first and second annular members, and back through the first annular member to the high pressure area, the first and second members being spaced from each other at all locations;
a first nozzle positioned in said circular leakage path and formed between said first annular member and one side of said finger of second annular member, said first nozzle axially converging toward the high pressure area;
a second nozzle positioned in said circular leakage path and formed within said first annular member, said second nozzle axially converging toward the high pressure area,
an axial leakage path formed between said first annular member and the other side of said finger of said second annular member, said axial leakage path being in fluid communication at one end with the low pressure area and at the opposite end with said first and second nozzles; and
means for causing the predominant amount of gas leaking from the high pressure area to flow along the circular path and return to the high pressure area, when the shaft is rotating at operating conditions.

20. The high pressure gas seal of claim 19 wherein said second first and second nozzles are substantially in axial alignment with each other and wherein said second nozzle is positioned downstream of said first nozzle when gas flows along said circular path to the high pressure area.

* * * * *